United States Patent
Krauss et al.

(10) Patent No.: US 9,739,082 B2
(45) Date of Patent: Aug. 22, 2017

(54) METHOD FOR OPENING A MOVABLE PANEL OF THE MOTOR VEHICLE AND CORRESPONDING OPENING CONTROL DEVICE

(71) Applicant: U-SHIN FRANCE, Creteil (FR)

(72) Inventors: Dietmar Krauss, Erdweg (DE); Dragos Molocea, Erdweg (DE)

(73) Assignee: U-SHIN FRANCE, Creteil (FR)

( * ) Notice: Subject to any disclaimer, the term of this patent is extended or adjusted under 35 U.S.C. 154(b) by 0 days.

(21) Appl. No.: 14/911,481

(22) PCT Filed: Oct. 8, 2014

(86) PCT No.: PCT/EP2014/071577
§ 371 (c)(1),
(2) Date: Feb. 11, 2016

(87) PCT Pub. No.: WO2015/052259
PCT Pub. Date: Apr. 16, 2015

(65) Prior Publication Data
US 2016/0186480 A1   Jun. 30, 2016

(30) Foreign Application Priority Data

Oct. 10, 2013   (EP) ..................................... 13188134

(51) Int. Cl.
*E05F 15/73* (2015.01)
*B60R 25/20* (2013.01)
*G07C 9/00* (2006.01)

(52) U.S. Cl.
CPC .......... *E05F 15/73* (2015.01); *B60R 25/2054* (2013.01); *G07C 9/00309* (2013.01); *E05F 2015/765* (2015.01); *E05Y 2900/531* (2013.01)

(58) Field of Classification Search
CPC . B60R 25/2054; B60R 25/2036; B60R 25/24; G06T 7/0004; B60Q 9/002; B60Q 1/0023; B60K 31/0008
See application file for complete search history.

(56) References Cited

U.S. PATENT DOCUMENTS 5,318,143 A * 6/1994 Parker ................ B60K 31/0008
                                                    180/168
6,130,506 A * 10/2000 Lopez .................. B60Q 1/0023
                                                    307/10.8
(Continued)

FOREIGN PATENT DOCUMENTS

DE    102008021989 A1    12/2008
FR       2979873 A1     3/2013

OTHER PUBLICATIONS

International Search Report issued in corresponding application No. PCT/EP2014/071577 mailed Apr. 11, 2014 (2 pages).
(Continued)

*Primary Examiner* — Yuri Kan
(74) *Attorney, Agent, or Firm* — Osha Liang LLP

(57) ABSTRACT

The invention relates to a method for opening a movable panel of a motor vehicle, comprising the following steps of: detecting the approach of a person (U) in the vicinity of the vehicle (V) by a detection device (3), identifying if the detected person (U) is authorized to unlock the vehicle (V) through authentication means, determining if there is an intention to open the movable panel (7), and—authorizing the opening of the movable panel (7) when an authorized person (U) with an intention to open the movable panel is detected. According to the invention, the step of determining if there is an intention to open the movable panel (7), comprises the sub-steps of: projecting at least a first light spot (12a) on the ground on which the motor vehicle (V) stands, —projecting at least a second light spot (12b) on the ground on which the motor vehicle (V) stands with a predefined distance from the first light spot (12a), identifying if the identified authorized person (U) performs a predefined triggering sequence: by stopping in a pre-determined order on the first light spot (12a) and then on the second light spot (12b) and with a predefined time interval (Continued)

Figure 1:
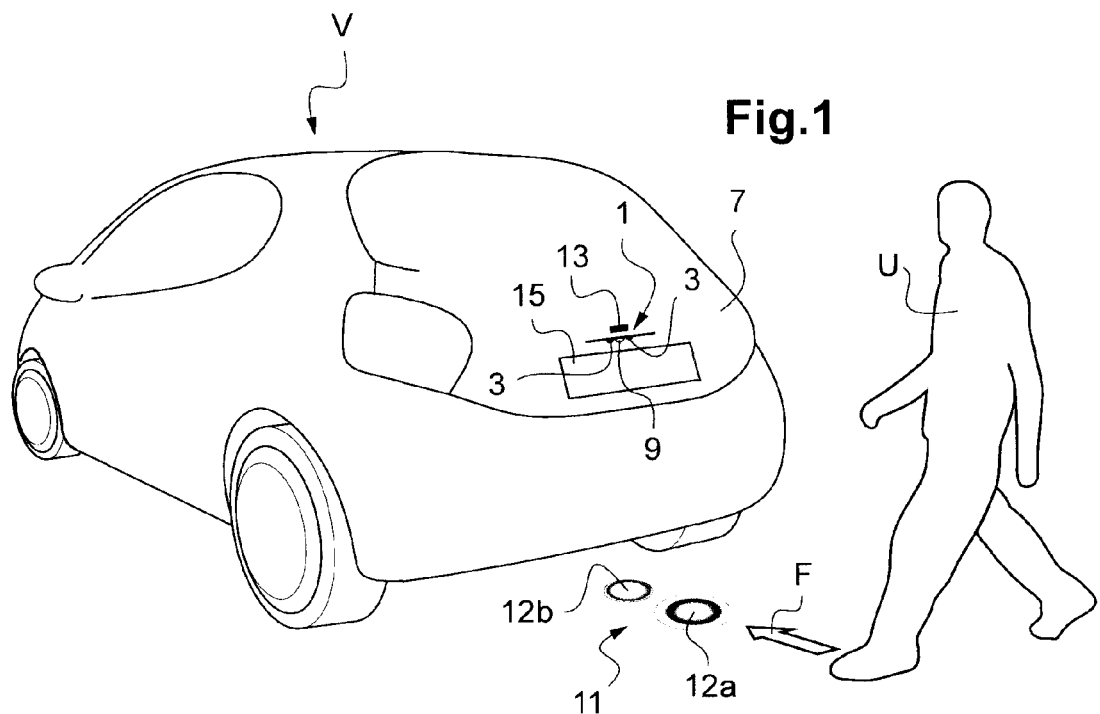

between the step of stopping on the first light spot (12a) and the step of stopping on the second light spot (12b). The invention also relates to an associated opening control device (1).

12 Claims, 2 Drawing Sheets

(56) References Cited

U.S. PATENT DOCUMENTS

| | | | | |
|---|---|---|---|---|
| 8,228,166 | B2* | 7/2012 | Eberhard | B60R 25/2036 340/5.61 |
| 8,706,350 | B2* | 4/2014 | Talty | B60R 25/24 701/36 |
| 8,823,552 | B1* | 9/2014 | Raphael | B60Q 9/002 340/435 |
| 2006/0093203 | A1* | 5/2006 | Good | G06T 7/0004 382/141 |
| 2008/0296926 | A1* | 12/2008 | Hanzel | B60R 25/2054 296/146.1 |

OTHER PUBLICATIONS

Written Opinion of the International Searching Authority issued in corresponding application No. PCT/EP2014/071577 dated Apr. 11, 2014 (6 pages).

* cited by examiner

METHOD FOR OPENING A MOVABLE PANEL OF THE MOTOR VEHICLE AND CORRESPONDING OPENING CONTROL DEVICE

The invention relates to a method for opening a movable panel of the motor vehicle. The invention also relates to an associated opening control device.

There are known devices for opening a movable panel of a motor vehicle using the physical contact of the hand or finger of the user to a switch or handle for opening said movable panel of the motor vehicle after unlocking. The movable panel is typically a trunk or a side door.

However, this type of opening requires the user to have a free hand. Thus, as an example if the user has all his hands already occupied or is unable to use his hands, there is a need to allow the opening of a movable panel of a motor vehicle without the use of physical contact of the user's hands with the switch or handle.

For that purpose, it is known to provide an opening device of a movable panel in which a sensor is used to activate a command for opening the movable panel.

Meanwhile, it is necessary to detect the presence of a person in the vicinity of the vehicle and identify this person as an authorized person so that the opening device can command the opening of the movable panel when an authorized person is detected.

However, since the opening of the vehicle is allowed, it is necessary to prevent intrusion of an unauthorized person in the vehicle.

For that purpose, it is known to authenticate the person as authorized to unlock the vehicle and then projecting for example on the ground, a light spot, to authenticate an intention for opening the movable panel by placing or moving a human part, a hand or a foot, in a predetermined manner in order to obscure the light spot for example.

The object of the present invention is to provide a reliable method for opening a movable panel of the motor vehicle preventing from impromptu and non authorized opening and requiring low electrical supply.

This object is achieved according to the invention by a method for opening a movable panel of a motor vehicle, comprising the following steps of:
  detecting the approach of a person in the vicinity of the vehicle by a detection device,
  identifying if the detected person is authorized to unlock the vehicle through authentication means,
  determining if there is an intention to open the movable panel, and
  authorizing the opening of the movable panel when an authorized person with an intention to open the movable panel is detected,
characterized in that the step of determining if there is an intention to open the movable panel, comprises the sub-steps of:
  projecting at least a first light spot on the ground on which the motor vehicle stands, projecting at least a second light spot on the ground on which the motor vehicle stands with a predefined distance from the first light spot,
  identifying if the identified authorized person performs a predefined triggering sequence:
    by stopping in a predetermined order on the first light spot and then on the second light spot and
    with a predefined time interval between the step of stopping on the first light spot and the step of stopping on the second light spot.

Thus the light beam is only projected when an authorized user is identified. Two conditions are required: detecting a user in the vicinity of the motor vehicle and then that the detected person is an authorized person, before projecting virtual switches for triggering the opening of the movable panel. This avoids a permanent projection and then reduces the electrical supplying.

Then, the projection of at least two virtual switches formed by at least two light spots of the virtual beam allows to define a precise triggering sequence according to a predetermined order and with a certain lapse of time between the moment of stopping on the first virtual switch and the moment of stopping on the second virtual switch.

The method according to the invention may also comprise one or more of the following features, taken separately or in combination:
  the first light spot and the second light spot are projected on the ground together simultaneously when an authorized person is identified;
  said method comprises a step of measuring the time elapsed between the step of stopping on the first light spot and the step of stopping on the second light spot, and a step of comparing the measured elapsed time to the predefined time interval;
  the first light spot is projected on the ground when an authorized person is identified,
  the second light spot is projected on the ground when the authorized person has stopped on the first light spot and for the predefined time interval;
  the second light spot is projected closer to the vehicle than the first light spot;
  said at least two light spots are aligned with regard to the longitudinal axis of the motor vehicle;
  said at least two light spots are aligned relative to each other and form an angle with regard to the longitudinal axis of the motor vehicle;
  said method comprises a step of sending a warning signal to indicate to perform again the triggering sequence, if the predefined triggering sequence is incorrect;
  the step of detecting the approach of a person in the vicinity of the vehicle is performed by one or more optical detectors, for example infrared detectors.

The invention also relates to an opening control device comprising at least one means for:
  detecting the approach of a person in the vicinity of the vehicle,
  identifying if the detected person is authorized to unlock the vehicle through authentication means,
  determining if there is an intention to open the movable panel, and
  authorizing the opening of the movable panel when an authorized person with an intention to open the movable panel is detected,
characterized in that the means for determining if there is an intention to open the movable panel, comprises:
  projection means for projecting on the ground on which the motor vehicle stands at least a first light spot and at least a second light spot,
  means for identifying if the identified authorized person performs a predefined triggering sequence by stopping in a predetermined order on the first light spot and then on the second light spot with a predefined time interval between the moment of stopping on the first light spot and the moment of stopping on the second light spot.

The opening control device according to the invention may also comprise one or more of the following features, taken separately or in combination:

said opening control device comprises a detection device for detecting the approach of a person in the vicinity of the vehicle, comprising one or more optical detectors, for example infrared detectors;

said opening control device comprises processing means for adapting the orientation of the projection means depending on where an approaching person is detected;

said opening control device comprises several projection means arranged on the motor vehicle with different orientation relative to each other, and comprising processing means for selecting at least one projection means to be activated depending on where an approaching person is detected.

Figure 2:
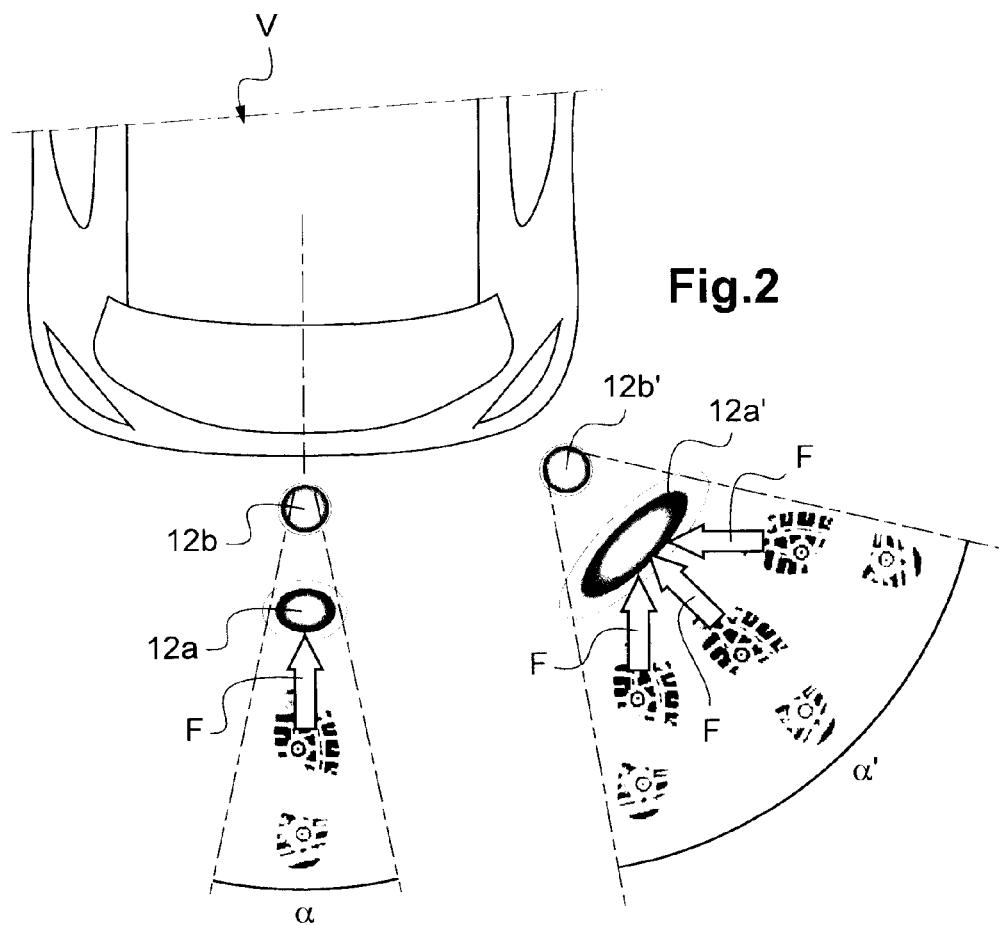

Other features and advantages of the invention will emerge more clearly on reading the following description, which is given as a non-limiting illustrative example, and the attached drawings, among which:

FIG. 1 is a perspective view showing a motor vehicle with an opening control device for detecting a person in the vicinity of the vehicle with an intention to open a movable panel of the motor vehicle before triggering the opening of the movable panel, FIG. 2 is a top view showing examples of detection angles for performing a gesture command for opening the movable panel, FIGS. 3a to 3d are top views of the vehicle illustrating examples of impromptu objects that do not trigger opening of the movable panel.

Figure 3A:
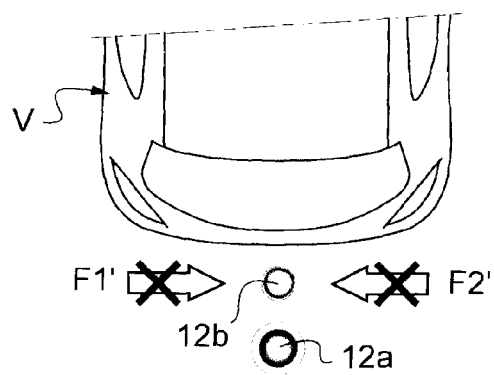
Figure 3B:
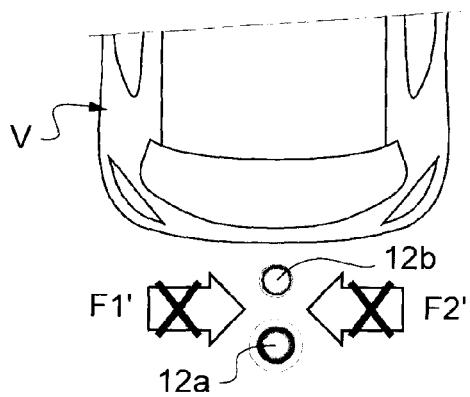
Figure 3C:
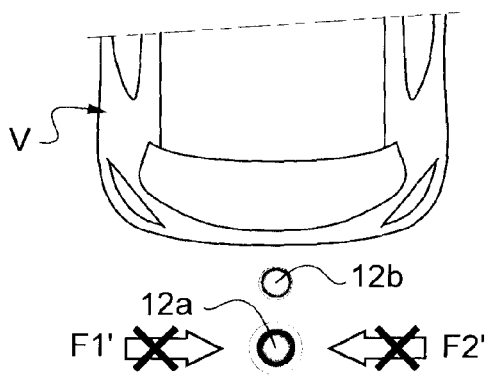
Figure 3D:
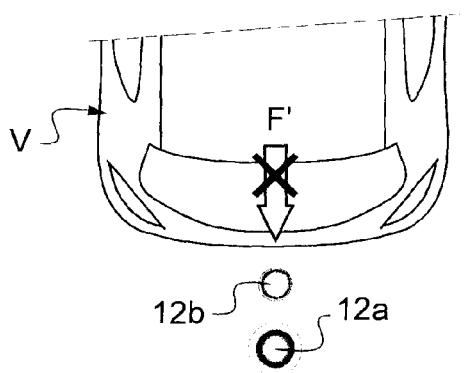
Figure 4:
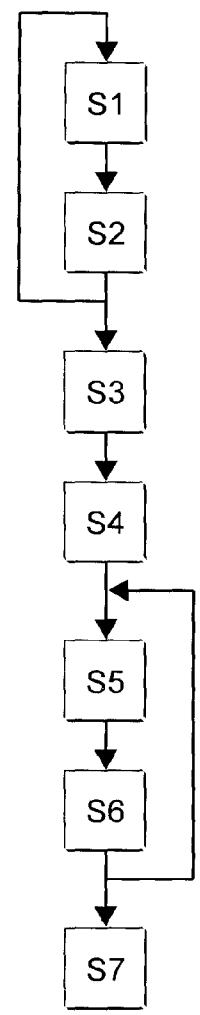

FIG. 4 is a diagram of an embodiment of a method for opening a movable panel of the motor vehicle using the detection device of FIGS. 1 to 3d.

In these figures, identical elements have the same references.

Opening Control Device for a Motor Vehicle

Referring to FIG. 1, the invention relates to an opening control device 1 for a motor vehicle V.

The opening control device 1 comprises:

at least one optical detector 3 for detecting the approach of a person U in the vicinity of the vehicle V in order to activate opening command means of an opening control device for opening a movable panel 7 of the vehicle V;

authentication means (not illustrated) for verifying that the detected person U near the vehicle V is an authorized person for unlocking the vehicle V and for activating opening command means when an authorized person is identified; opening command means of the movable panel.

The optical detector 3 is mounted on the vehicle V. According to one embodiment, the optical detector 3 is arranged on the vehicle movable panel 7 to be opened, such as a side door or a tailgate 7.

The optical detector 3 comprises a transmitter and a receiver. The transmitter is able to project a detection beam. Advantageously, the projected detection beam is of wavelength of invisible spectrum for human, infrared beam in a preferred embodiment. Thus, the optical detector 3 is advantageously an infrared detector 3.

The transmitter is further configured to project long reach detection beams.

The authentication means (not illustrated) for verifying that the detected person U, also named user U, near the vehicle V is an authorized person for unlocking the vehicle V may comprise an antenna able to communicate with an identifier such as a transponder carried by the user U, for example in the key, or disposed adjacent to the user U. The transponder is adapted to receive a signal sent by the antenna.

The antenna is connected to identifying means on-board. This identifying means may determine if the person holding or adjacent to the transponder is an authorized person.

The opening command means comprise light projection means 9 of at least a light beam.

The light projection means 9 are mounted on the vehicle V, for example on the movable panel 7 such as a side door or the tailgate 7 (FIG. 1).

The light projection means 9 may comprise one or more diodes to achieve the one or more light beams. The light beam may be of any color.

The light beam is projected on the ground on which the vehicle V stands thus forming a light pattern 11 on the ground as shown in FIG. 1. The light pattern 11 may be of any shape, including a luminous round, an arrow indicating a direction, a cross. The shape may be an opened shape such as a "U-shape" or a closed shape for instance a round or an oval shape.

According to the invention, the light projection means project at least two light spots 12a and 12b, for example several rounds or a set of arrows. These two light spots 12a, 12b may form each one light pattern 11 or may form together a light pattern 11.

Of course, the light spots 12a, 12b may have or not substantially the same shape. These projected light spots 12a, 12b form virtual switches with which the user U has to interact in order to trigger the opening of the movable panel 7.

In the example shown in FIG. 1, a first light spot 12a and a second light spot 12b forming two virtual switches 12a and 12b are projected with a predefined distance between the first light spot 12a and the second light spot 12b, so that both virtual switches 12a and 12b are non-overlapping. As an example, the predefined distance between both light spots may be in the order of five centimeters.

In the illustrated example of FIG. 1, the second light spot 12b is closer to the vehicle V than the first light spot 12a. The closest light spot 12b from the vehicle V is here smallest than the first light spot 12a.

The at least two light spots 12a, 12b may be aligned with regard to the longitudinal axis of the vehicle V as illustrated in FIG. 1.

Of course, other orientations are possible. As can be seen in FIG. 2, the projection means 9 may be arranged in order to project two light spots 12a, 12b aligned with regard to the longitudinal axis of the vehicle V and/or in order to project two light spots 12a' and 12b' forming an angle, meaning a non null angle, with regard to the longitudinal axis of the vehicle V.

In other words, the opening control device 1 may comprise one projection means 9 and processing means for adapting the orientation of the projection means 9 depending on where an approaching person U is detected, for instance by the optical detector 3. Alternatively, the opening control device 1 may comprise several projection means 9 arranged on the vehicle V with different orientation and processing means for selecting the projection means 9 to be activated depending on where an approaching person U is detected, for instance by the optical detector 3.

The at least two light spots 12a and 12b, or alternatively 12a' and 12b' of the light pattern 11 define respectively a detection angle α, α' of the movement of one human part such as a foot performing the gesture command. This detection angle α, α' is for example predefined. Alternatively, the opening control device 1 may comprise means for adapting the angle width.

According to an embodiment, the projection means 9 are configured to project the first light spot 12a, 12a' and the second light spot 12b, 12b' together at same time when an authorized person U is identified.

Alternatively, the projection means 9 may be configured to first project only the first light spot 12a, 12a' when an authorized person U is detected in the vicinity of the vehicle V and is identified. Then, the projection means 9 may be configured to project the second light spot 12b, 12b', if the user U stopped on the first light spot 12a, 12a'. The projection means 9 may stop the projection of the first light spot 12a, 12a' when the second light spot 12b, 12b' is projected.

Moreover, the projection means 9 may be configured to project the second light spot 12b, 12b' for a predefined time interval, for example in the order of thirty seconds.

If the user U doesn't stop on the second light spot 12b, 12b' during its projection time interval, the projection means 9 stops the projection of the second light spot 12b, 12b'. Of course, if the first light spot 12a, 12a' has not been stopped during the projection of the second light spot 12b, 12b', the projection means 9 may also stop the first light spot 12a, 12a' projection.

This embodiment offers an ergonomic aid for the user U because the user U is guided through the successive light spots 12a, 12b or 12a', 12b' which are projected. This embodiment further reduces the electrical supply regarding the first embodiment with a projection of two light spots at same time.

The opening command means further comprise determination means for determining if there is an intention to open the movable panel 7. The determination means are configured to determine whether a gesture command by placement or movement of one human part, such as one hand or foot, is made in accordance with a predetermined manner and if the movable panel 7 can be opened or not.

The predetermined manner is a triggering sequence. The user has to stop on the first light spot 12a, 12a' before stopping on the second light spot 12b, 12b'. This is true when both light spots 12a, 12b or 12a', 12b' are projected together simultaneously or when the second light spot 12b, 12b' is projected only after the user has stopped on the first light spot 12a.

So, the user U has to move in direction to the vehicle V.

Referring to FIG. 1, a movement according to the arrow F in direction to the vehicle V during which the user U stops on the second light spot 12b only after having stopped on the first light spot 12a can be identified as a correct trigger sequence.

Thus the opening control device 1 comprises means for identifying if the identified authorized person U performs a predefined triggering sequence by stopping in a predetermined order on the first light spot 12a and then on the second light spot.

Both light spots 12a and 12b must be crossed one after the other in the predefined order but must not be crossed at same time.

More precisely, a predefined time interval between the moment of stopping on the first light spot 12a and the moment of stopping on the second light spot 12b must be respected. This time interval defines a minimum time limit and a maximum time limit, both time limits are non null. Thus the time elapsed or the time differential between the time when stopping on the second light spot 12b and the time when stopping on the first light spot 12a must be comprised in the predefined time interval, being higher than the minimum time limit and lower than the maximum time limit. If none or only one of those two conditions is true, the opening of the movable panel 7 cannot be triggered.

This advantageously avoids that an impromptu object such as a tree branch, or a ball or a small animal may activate the movable panel 7 opening by interacting with the virtual switches 12a, 12b formed by the light pattern 11 on the ground.

For that purpose, the opening control device 1 may further comprise means for measuring the time elapsed between the moment of stopping on the first light spot 12a and the moment of stopping on the second light spot 12b, and means for determining if the lapse of time between the moment of stopping on the first light spot 12a and the moment of stopping on the second light spot 12b is comprised in the predefined time interval.

Alternatively, in case the second light spot 12b is projected when the user U stops on the first light spot 12a, the second light spot 12b is projected only for a predefined time interval, and the user U has to stop on the second light spot 12b during this predefined time interval.

Examples of wrong sequences that cannot trigger the opening of the movable panel 7 are illustrated in a schematic way in FIGS. 3a to 3d, such as stopping only on one light spot forming a virtual switch, or crossing both light spots at same time or stopping on the light spots in the wrong order, meaning first the second light spot 12b and then the first light spot 12a.

Taking for example FIGS. 3a and 3c, a small object moving according to an arrow F1' or F2' crossing only one of the two light spots 12a, 12b, for example coming from one side, for example from the left considering arrow F1', or from the other side, for example coming from the right considering arrow F2', cannot be identified as a correct trigger sequence.

In FIG. 3a, a small object moving according to arrow F1' coming from the left relatively to FIG. 3a, only crosses the second light spot 12b and never crosses the first light spot 12a. Thus, the movement of the impromptu object activating randomly the second virtual switch 12b but not the first virtual switch 12a cannot be identified as a correct trigger sequence.

It is similar when a small object moving according to arrow F2' coming from the right relatively to FIG. 3a, only crosses the second light spot 12b and never crosses the first light spot 3a, thus, cannot be identified as a correct trigger sequence.

In FIG. 3c, a small object moving according to arrow F1', respectively F2', coming from the left, respectively the right, relatively to FIG. 3c, only crosses the first light spot 12a and never crosses the second light spot 12b. Thus, the movement of the impromptu object activating randomly the first virtual switch 12a but not the second virtual switch 12b cannot be identified as a correct trigger sequence.

Considering now a bigger object, moving indifferently according to arrow F1', or according to arrow F2', coming from the left, respectively from the right, relatively to FIG. 3b, if this object crosses simultaneously both second light spot 12b and first light spot 12a, the movement activating simultaneously both virtual switches 12a, 12b cannot be identified as a correct trigger sequence. Indeed even though both virtual switches 12a and 12b are activated, they are not activated one after the other, the differential time is here null and thus lower than the minimum time limit.

Referring to another example in FIG. 3d, when an object moving according to arrow F' crosses first the second light spot 12b and then the first light spot 12a, it cannot be identified as a correct trigger sequence because the predefined order is not verified.

Referring back to FIGS. 1 and 2, one or more optical sensors 13 may be configured to detect any variation from the light beam in order to detect if the user has stopped on the first light spot 12a, 12a' and/or on the second light spot 12b, 12b'.

According to the embodiment of FIG. 1, the optical sensors 13 are arranged on the movable panel to be opened, for instance on the tailgate 7.

The optical detector 3, the light projection means 9 and the optical sensors 13 may be arranged close relative to each other, for example on or near the rear registration plate 15 as illustrated in FIG. 2.

The optical sensors 13 are intended to detect any variation in brightness due to interception of a light beam by an object or by a human part, such as foot or hand.

The optical sensors 13 may be connected to the determination means which determine that the movement has or has not been done properly, meaning according to the predefined trigger sequence as explained above. The determination means may trigger the opening of the movable panel 7 when the movement has been done properly or not to trigger the opening of the movable panel 7 when the movement has not been done properly.

Referring now to FIG. 4, a method for opening a movable panel of the motor vehicle is described.

Method for Opening a Movable Panel 7 of the Motor Vehicle

As shown in FIG. 4, the method for opening a movable panel 7 of a motor vehicle comprises the following steps S1 to S7.

At step S1, detecting the approach of a person near the vehicle V by one or more optical detectors 3. For that, at least a portion of the body of a person U may be detected.

Once step S1 is performed and validated, meaning a person is detected, step S2 can begin.

At step S2, authenticating the detected person U as authorized to unlock the vehicle V through authentication means. That is a step to verify and validate the identity of a person to be entitled to access to the vehicle.

If an authorized person is identified, the method can perform step S3.

If the approaching person is not identified as an authorized person, step S1 starts again.

At step S3, activating opening command means for opening a movable panel 7 of the motor vehicle, if an authorized person U is identified. Step S3 is only performed when steps S1 and S2 are validated.

As an example, depending on where an approaching person U is detected for instance by the optical detector and/or by the authentication means, the orientation of the projection means 9 of the light spots may be adapted.

Alternatively, depending on where an approaching person U is detected for instance by the optical detector and/or by the authentication means, the method may comprise a substep of selecting at least one projection means 9 to be activated among several projection means 9 arranged on the motor vehicle V with different orientation relative to each other.

According to a first embodiment, at step S4, projecting at least one first light spot 12a, 12a' on the ground on which the motor vehicle V stands as shown in FIG. 1, and projecting at least one second light spot 12b, 12b' on the ground on which the vehicle stands.

Both light spots 12a, 12b or 12a', 12b' may be projected together simultaneously.

Both light spots 12a, 12b, or 12a', 12b' do not overlap and are projected with a predefined distance between them.

These light spots 12a, 12b, 12a', 12b', form at least two virtual switches for triggering the opening command of the movable panel 7.

Alternatively at step S4, only the first light spot 12a, 12a' is projected.

At step S5, performing a predefined gesture command for opening a vehicle movable panel 7. That means, the user U has to perform a predefined trigger sequence.

According to the described example in FIG. 1, the user U may place one human part, such as one hand or one foot, in the light beam, in order to obscure or hide first the first virtual switch formed by the first light spot 12a, 12a' projected on the ground, and then the second virtual switch formed by the second light spot 12b, 12b' is projected on the ground.

The first light spot 12a, 12a' must be crossed before the second light spot 12b, 12b' and the time between the step of stopping on the first light spot 12a, 12a' and the step of stopping on the second light spot 12b, 12b' must be comprised in a predefined time interval. This advantageously avoids any intrusion of an object or a small animal emerging and obscuring for example the light pattern on the ground to trigger the opening of the vehicle movable panel 7.

Alternatively at step S5, the user U may place one human part, such as one hand or one foot, in the light beam, in order to obscure or hide first the first virtual switch formed by the first light spot 12a, 12a' projected on the ground. Then the second light spot 12b, 12b' forming a second virtual switch is projected on the ground for a predefined time interval. The projection of the first light spot 12a, 12a' may be stopped. The second light spot 12b, 12b' must be crossed during the predefined time interval of projection of the second light spot 12b, 12b'.

At step S6, identifying an authorized gesture command. That means identifying if the placement or movement of the foot or hand or any other human part, is made according or not to the predefined triggering sequence.

For that purpose, the method comprises according to the first embodiment, a step of measuring the time elapsed between the moment of stopping on the first light spot 12a, 12a' and the moment of stopping on the second light spot 12b, 12b', and a step of comparing the measured elapsed time to the predefined time interval.

Alternatively, the method comprises a step S6 for determining if the user U has stopped on the second light spot 12b, 12b' during its projection time interval.

Step S6 allows the opening control device 1 to identify if there is an intention to open the vehicle movable panel 7.

If the gesture of the foot or hand for example is not performed according to the predefined trigger sequence, a signal may be sent to indicate to perform again the triggering sequence at step S5. In case it is necessary to repeat step S5, the user U must move his foot or hand for example to reposition it correctly according to the predefined trigger sequence. The signal to reposition the human part such as hand or foot, may be a visual signal for example a flashing of the light beam, a change in color of the light beam, and/or a signal tone.

If the authorized person U performs the predefined triggering sequence, a signal may be sent for authorizing the opening of the movable panel 7 and the opening command means can open the movable panel 7. The light spots projections are stopped.

At step S7, opening the vehicle movable panel 7 if the predefined triggering sequence has been performed. As a consequence, the opening of the vehicle movable panel 7 is achieved only if the gesture of the user U is made according to a precise trigger sequence.

Then, the movable panel 7 is opened, the user U may get in the vehicle or put something in the trunk.

Thus, virtual switches are shown only when an authorized user is identified. Two first conditions are required before projecting virtual switches for triggering the opening of the movable panel. This avoids a permanent projection of triggering area, here the at least two light spots 12a, 12a', 12b, 12b', forming virtual switches.

Then, the projection of at least two virtual switches 12a, 12b or 12a', 12b' allows to define a precise triggering sequence according to a predetermined order and with a lapse of time between the moment of stopping on the first virtual switch and the moment of stopping on the second virtual switch.

Through such a method and corresponding opening control device, the opening of the movable panel 7 of the motor vehicle V is reliable and efficient while requiring low electrical supplying.

The invention claimed is:

1. A method for opening a movable panel of a motor vehicle, comprising:
   detecting an approach of a person in a vicinity of the motor vehicle by a detection device;
   identifying if the detected person is authorized to unlock the motor vehicle through authentication means;
   determining if there is an intention to open the movable panel; and
   authorizing the opening of the movable panel when an authorized person with the intention to open the movable panel is detected,
   wherein determining if there is an intention to open the movable panel, comprises:
      projecting at least a first light spot on ground on which the motor vehicle stands,
      projecting at least a second light spot on the ground on which the motor vehicle stands with a predefined distance from the first light spot,
      identifying that the identified authorized person performs a predefined triggering sequence by stopping in a predetermined order on the first light spot and then on the second light spot and with a predefined time interval between stopping on the first light spot and stopping on the second light spot,
      wherein the first light spot and the second light spot are projected on the ground together simultaneously when the authorized person is identified.

2. The method as set forth in claim 1, further comprising measuring a time elapsed between the step of stopping on the first light spot and the step of stopping on the second light spot, and comparing the measured elapsed time to the predefined time interval.

3. A method for opening a movable panel of a motor vehicle, comprising:
   detecting an approach of a person in a vicinity of the motor vehicle by a detection device;
   identifying if the detected person is authorized to unlock the motor vehicle through authentication means;
   determining if there is an intention to open the movable panel; and
   authorizing the opening of the movable panel when an authorized person with the intention to open the movable panel is detected,
   wherein determining if there is an intention to open the movable panel comprises:
      projecting at least a first light spot on ground on which the motor vehicle stands,
      projecting at least a second light spot on the ground on which the motor vehicle stands with a predefined distance from the first light spot,
      identifying that the identified authorized person performs a predefined triggering sequence by stopping in a predetermined order on the first light spot and then on the second light spot and with a predefined time interval between stopping on the first light spot and stopping on the second light spot,
      wherein the first light spot is projected on the ground when the authorized person is identified, and
      wherein the second light spot is projected on the ground when the authorized person has stopped on the first light spot and for the predefined time interval.

4. The method as set forth in claim 1, wherein the second light spot is projected closer to the motor vehicle than the first light spot.

5. The method as set forth in claim 1, wherein the at least two light spots are aligned with regard to the longitudinal axis of the motor vehicle.

6. The method as set forth in claim 1, wherein the at least two light spots are aligned relative to each other and form an angle with regard to the longitudinal axis of the motor vehicle.

7. The method as set forth in claim 1, further comprising sending a warning signal to indicate to perform again the triggering sequence, when the predefined triggering sequence is incorrect.

8. The method as set forth in claim 1, wherein detecting the approach of a person in the vicinity of the motor vehicle is performed by one or more infrared detectors.

9. An opening control device comprising a processor for:
   detecting an approach of a person in the vicinity of a motor vehicle,
   identifying if the detected person is authorized to unlock the motor vehicle through authentication means,
   determining when there is an intention to open a movable panel, and
   authorizing the opening of the movable panel when an authorized person with an intention to open the movable panel is detected,
   wherein determining when there is an intention to open the movable panel, comprises:
      projecting on ground on which the motor vehicle stands at least a first light spot and at least a second light spot,
      identifying if the identified authorized person performs a predefined triggering sequence by stopping in a predetermined order on the first light spot and then on the second light spot with a predefined time interval between a moment of stopping on the first light spot and a moment of stopping on the second light spot,
   wherein the first light spot and the second light spot are projected on the ground together simultaneously when the authorized person is identified, and
   wherein the device further comprises a sensor capable of detecting, sensing, or determining a gesture, or a gesture command by placement or movement of a human body part.

10. The opening control device as set forth in claim 9, further comprising a detection device for detecting the approach of a person in the vicinity of the motor vehicle, the detection device comprising one or more infrared detectors.

11. The opening control device as set forth in claim 9, wherein the processor is further configured for adapting an orientation of the projection means depending on where an approaching person is detected.

12. The opening control device as set forth in claim 9, further comprising a plurality of projection means arranged on the motor vehicle with different orientations relative to each other, and processing means for selecting at least one projection means to be activated depending on where an approaching person is detected.

* * * * *

UNITED STATES PATENT AND TRADEMARK OFFICE
CERTIFICATE OF CORRECTION

PATENT NO. : 9,739,082 B2
APPLICATION NO. : 14/911481
DATED : August 22, 2017
INVENTOR(S) : Krauss et al.

It is certified that error appears in the above-identified patent and that said Letters Patent is hereby corrected as shown below:

On the Title Page

Item (72) Inventor is corrected to read:
-- Dietmar Krauss, Erdweg, (DE);
Dragos Molocea, Erdweg, (DE);
Bernd Ette, Wolfsburg, (DE) --.

Signed and Sealed this
Second Day of June, 2020

Andrei Iancu
*Director of the United States Patent and Trademark Office*